(12) United States Patent
Gradillas et al.

(10) Patent No.: US 10,337,662 B1
(45) Date of Patent: Jul. 2, 2019

(54) WATER COOLER STAND (71) Applicants: Leonard Galindo Gradillas, El Mirage, AZ (US); Fausto Figueroa, El Mirage, AZ (US)

(72) Inventors: Leonard Galindo Gradillas, El Mirage, AZ (US); Fausto Figueroa, El Mirage, AZ (US)

(*) Notice: Subject to any disclaimer, the term of this patent is extended or adjusted under 35 U.S.C. 154(b) by 154 days.

(21) Appl. No.: 15/614,674

(22) Filed: Jun. 6, 2017

Related U.S. Application Data (60) Provisional application No. 62/350,501, filed on Jun. 15, 2016.

(51) Int. Cl.
| | |
|---|---|
| *F16M 11/10* | (2006.01) |
| *F16M 11/08* | (2006.01) |
| *E03C 1/18* | (2006.01) |
| *F16M 11/18* | (2006.01) |
| *B67D 1/00* | (2006.01) |
| *B67D 1/08* | (2006.01) |

(52) U.S. Cl.
CPC ............ *F16M 11/10* (2013.01); *B67D 1/0004* (2013.01); *B67D 1/0082* (2013.01); *B67D 1/0891* (2013.01); *E03C 1/18* (2013.01); *F16M 11/18* (2013.01)

(58) Field of Classification Search
CPC .......... F16M 11/10; F16M 11/18; E03C 1/18; B67D 1/0004; B67D 1/0082; B67D 1/0891
USPC .......................... 4/619–660; 251/295; 74/27, 74/473.16–473.17, 478–478.5, 560, 512; 222/179–181.3, 183–186
See application file for complete search history.

(56) References Cited

U.S. PATENT DOCUMENTS

| | | | | |
|---|---|---|---|---|
| 924,047 | A | * | 5/1908 | Ellman |
| 1,794,484 | A | * | 3/1931 | Seidel ..................... F16K 31/62 222/179 |
| 1,863,133 | A | * | 6/1932 | Ziedins .................. G01F 11/24 222/179 |
| 1,939,981 | A | * | 12/1933 | Hillyard ............... A47K 5/1214 222/179 |
| 2,436,030 | A | * | 2/1948 | Abbott ................. A47K 5/1205 222/179 |
| 2,594,938 | A | * | 4/1952 | Leavitt ..................... E03C 1/18 4/626 |
| 2,713,954 | A | * | 7/1955 | Spenner ............... A47K 5/1205 222/179 |
| 3,090,528 | A | * | 5/1963 | Ellis ........................ A47K 5/06 222/179 |

(Continued)

*Primary Examiner* — Paul R Durand
*Assistant Examiner* — Andrew P Bainbridge
(74) *Attorney, Agent, or Firm* — Kyle A. Fletcher, Esq.

(57) ABSTRACT

The water cooler stand is an elevated stand for a water cooler that comprises a foot-operated mechanism for operating the spigot on the water cooler. The water cooler rests on the top surface of the stand and is retained there by a cooler cradle and two handle retention springs. A foot pedal located on the bottom, front leg of the stand is mechanically linked to a pressure plate in front of the spigot. A protrusion on the center of the front pressure plate will depress the push button on the spigot when the foot pedal is depressed. Use of the water cooler stand eliminates contamination and the spread of bacteria and germs to others. The water cooler stand may also comprise a slide-out sink basin and a hinged side tray to provide additional workspace.

18 Claims, 7 Drawing Sheets

(56) References Cited

U.S. PATENT DOCUMENTS

| | | | | |
|---|---|---|---|---|
| 3,233,787 A * | 2/1966 | Ross | | A47K 5/1205 222/179 |
| 3,594,830 A * | 7/1971 | Clifton | | A45D 19/04 4/625 |
| 5,263,684 A | 11/1993 | McGuire | | |
| 5,313,676 A * | 5/1994 | Wright | | A47K 1/02 4/631 |
| 5,687,434 A * | 11/1997 | Tagg | | A47K 1/02 4/625 |
| 5,813,063 A * | 9/1998 | Watkins | | E03C 1/18 4/626 |
| 5,897,031 A * | 4/1999 | Wirt | | A47K 5/1204 222/179 |
| D421,490 S * | 3/2000 | Talerico | | D23/267 |
| 6,517,036 B1 | 2/2003 | Ramirez, Jr. | | |
| 6,578,802 B1 * | 6/2003 | Thier | | B67D 3/0009 248/146 |
| 6,708,845 B2 * | 3/2004 | Weng | | A47K 10/32 222/135 |
| 6,814,333 B1 * | 11/2004 | Freiburger | | F16M 11/38 248/150 |
| D528,344 S | 9/2006 | Mika | | |
| 7,926,413 B2 * | 4/2011 | Hart | | A47J 31/4403 222/108 |
| 7,954,183 B2 * | 6/2011 | Cawthon | | A22C 17/08 4/643 |
| 8,245,330 B2 * | 8/2012 | Atkinson | | E03B 1/04 4/625 |
| 8,844,069 B1 * | 9/2014 | Harvey | | A47K 1/02 4/625 |
| 8,973,179 B2 * | 3/2015 | Thwaites | | A47K 1/02 4/647 |
| 9,157,549 B2 | 10/2015 | Ashby | | |
| 9,353,885 B1 * | 5/2016 | Smith | | A01K 7/06 |
| 2005/0086738 A1 * | 4/2005 | Gragtmans | | A47K 3/022 4/622 |
| 2008/0035241 A1 | 2/2008 | Wittbold | | |
| 2010/0276513 A1 * | 11/2010 | Huff | | A01G 25/09 239/266 |
| 2016/0347598 A1 * | 12/2016 | Gannon | | B67D 1/0857 |

* cited by examiner

WATER COOLER STAND

CROSS REFERENCES TO RELATED APPLICATIONS

This non-provisional patent application claims the benefit of U.S. Provisional Application No. 62/350,501, which was filed on Jun. 15, 2016 by the applicants.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of recreational equipment, more specifically, a water cooler stand that provides hands-free operation.

Outdoorsmen currently use push button water coolers for storing and dispensing water for drinking and hand washing. Outdoorsmen spend days out in the field without bathing or washing and create unsanitary conditions with their hands, especially after going to the bathroom in the field with possible fecal matter on their hands.

The problem is that when they dispense water from a push button cooler for drinking or hand washing it requires the user to physically touch the push button on the water cooler using one or two unsanitary fingers. This may contaminate the dispensing surface area with bacteria and germs which can be picked up by the next user who presses the push button on the cooler.

The use of standalone push button coolers for drinking water allows for the spears of germs and contamination to others, easily creating a health hazard.

SUMMARY OF INVENTION

The water cooler stand is an elevated stand for a water cooler that comprises a foot-operated mechanism for operating the spigot on the water cooler. The water cooler rests on the top surface of the stand and is retained there by a cooler cradle and two handle retention springs. A foot pedal located on the bottom, front leg of the stand is mechanically linked to a pressure plate in front of the spigot. A protrusion on the center of the front pressure plate will depress the push button on the spigot when the foot pedal is depressed. Use of the water cooler stand eliminates contamination and the spread of bacteria and germs to others. The water cooler stand may also comprise a slide-out sink basin and a hinged side tray to provide additional workspace.

An object of the invention is to provide a water cooler stand comprising a hands-free mechanism for dispensing water from a push button cooler.

Another object of the invention is to secure the water cooler to the water cooler stand using a cradle and handle retention springs.

Yet another object of the inventions is to provide a slide-out sink basin for use with the water cooler.

A further object of the invention is to provide a hinged side tray to provide a workspace near the water cooler.

These together with additional objects, features and advantages of the water cooler stand will be readily apparent to those of ordinary skill in the art upon reading the following detailed description of the presently preferred, but nonetheless illustrative, embodiments when taken in conjunction with the accompanying drawings.

In this respect, before explaining the current embodiments of the water cooler stand in detail, it is to be understood that the water cooler stand is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the water cooler stand.

It is therefore important that the claims be regarded as including such equivalent construction insofar as they do not depart from the spirit and scope of the water cooler stand. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive. As used herein, the word "near" is intended to mean "within 20%". As a non-limiting example, if element A is said to be near the top end of element B, it means that the distance from element A to the top end of element B is less than or equal to 20% of the total length of element B. As used herein, "substantially straight" is intended to mean that deviations which prevent the element from being perfectly straight are either imperfections or cosmetic variations that do not affect the operation performed by the element.

Figure 1:
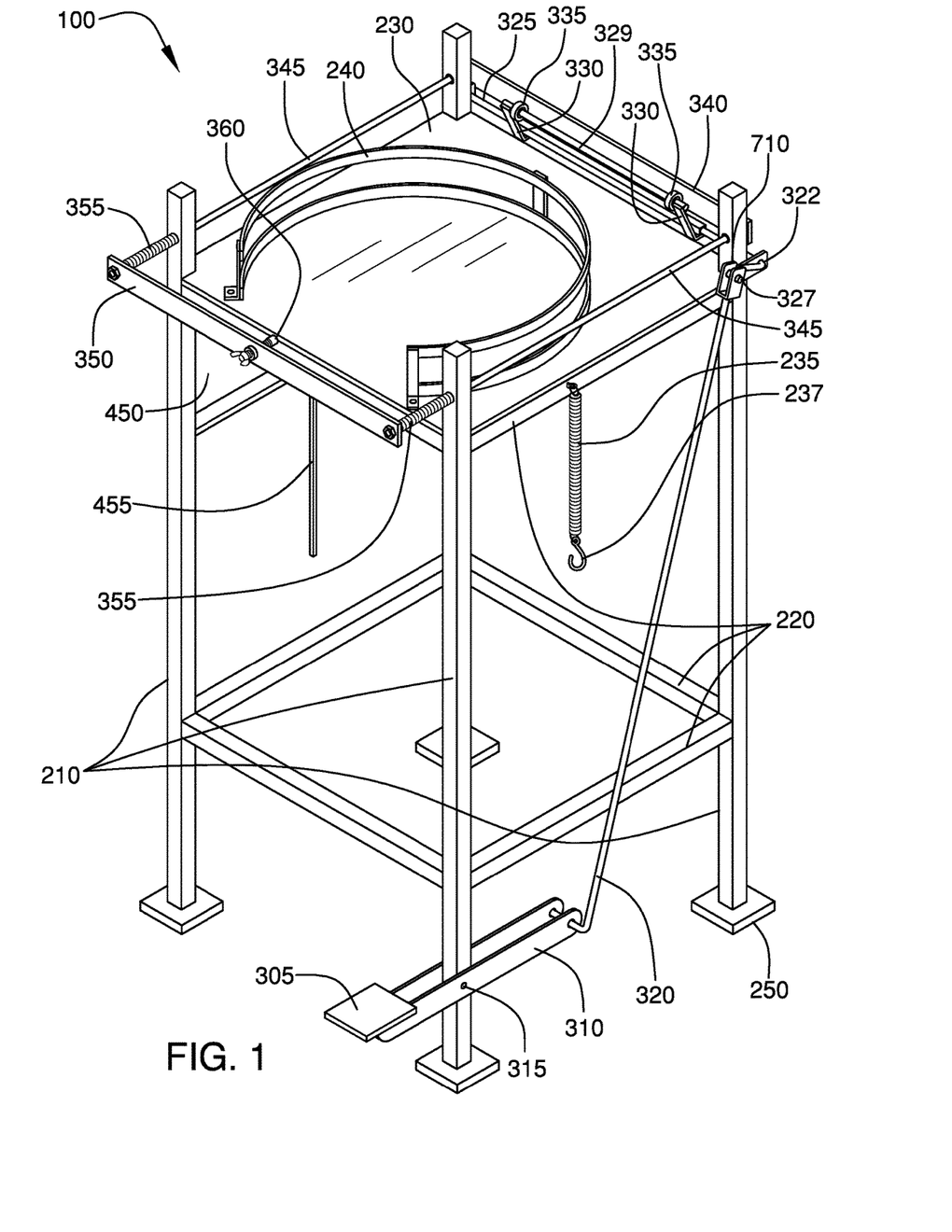
FIG. 1 is a perspective view of an embodiment of the disclosure viewed from the right, front side.
Figure 2:
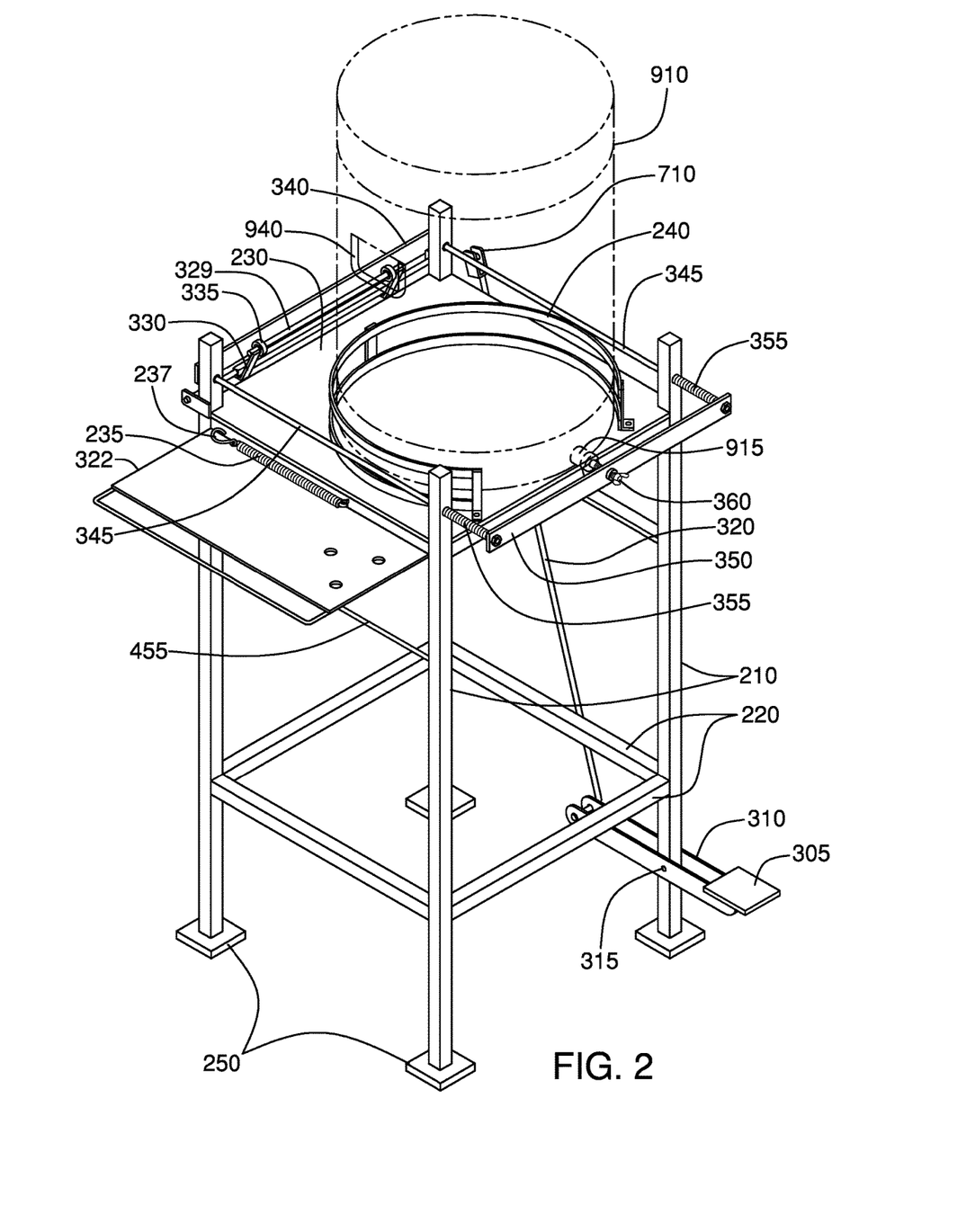
FIG. 2 is a perspective view of an embodiment of the disclosure viewed from the left front side and showing where the water cooler resides.
Figure 3:
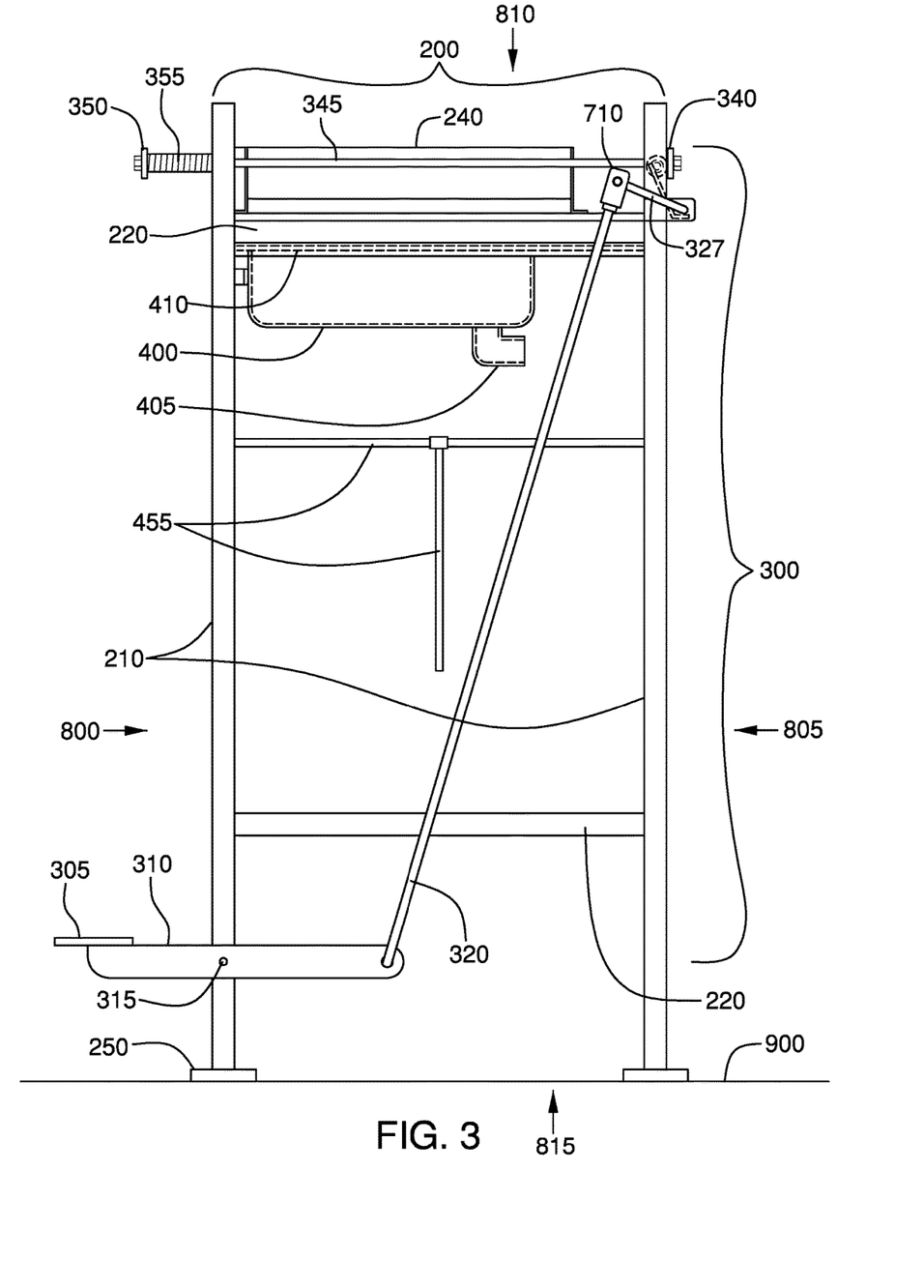
FIG. 3 is a right side view of an embodiment of the disclosure.
Figure 4:
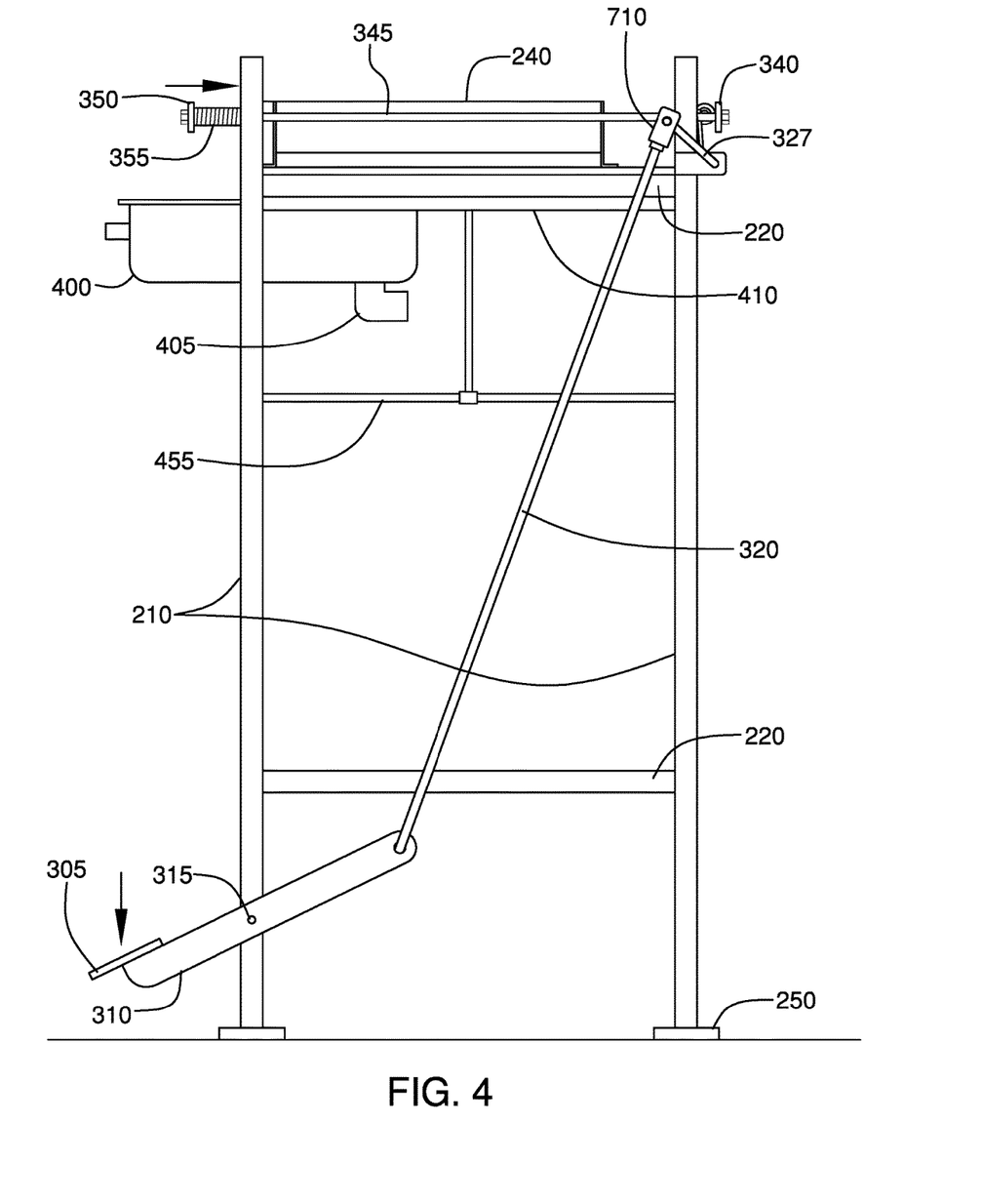
FIG. 4 is a right side view of an embodiment of the disclosure showing the foot pedal in the depressed position.
Figure 5:
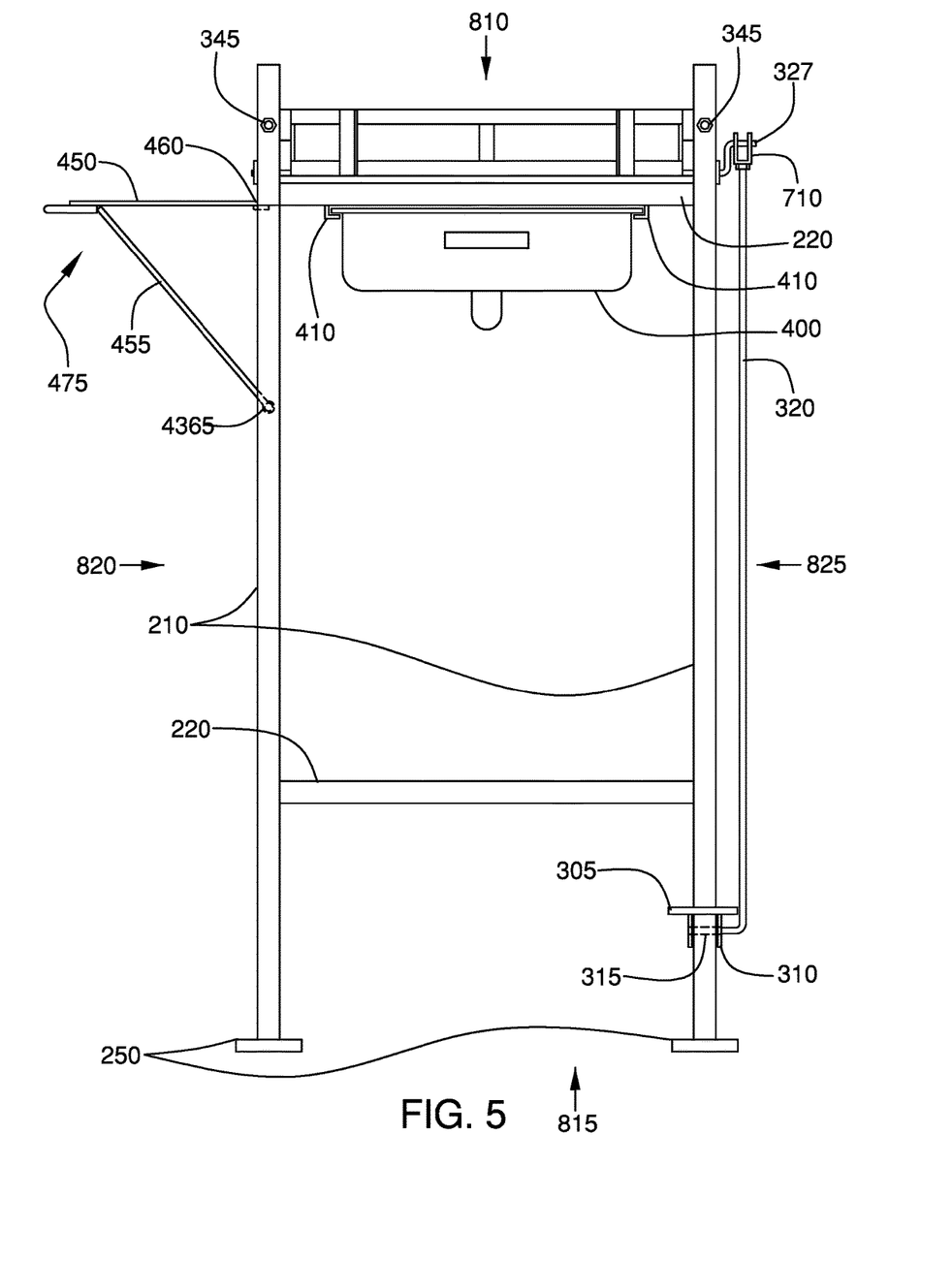
FIG. 5 is a front view of an embodiment of the disclosure.
Figure 6:
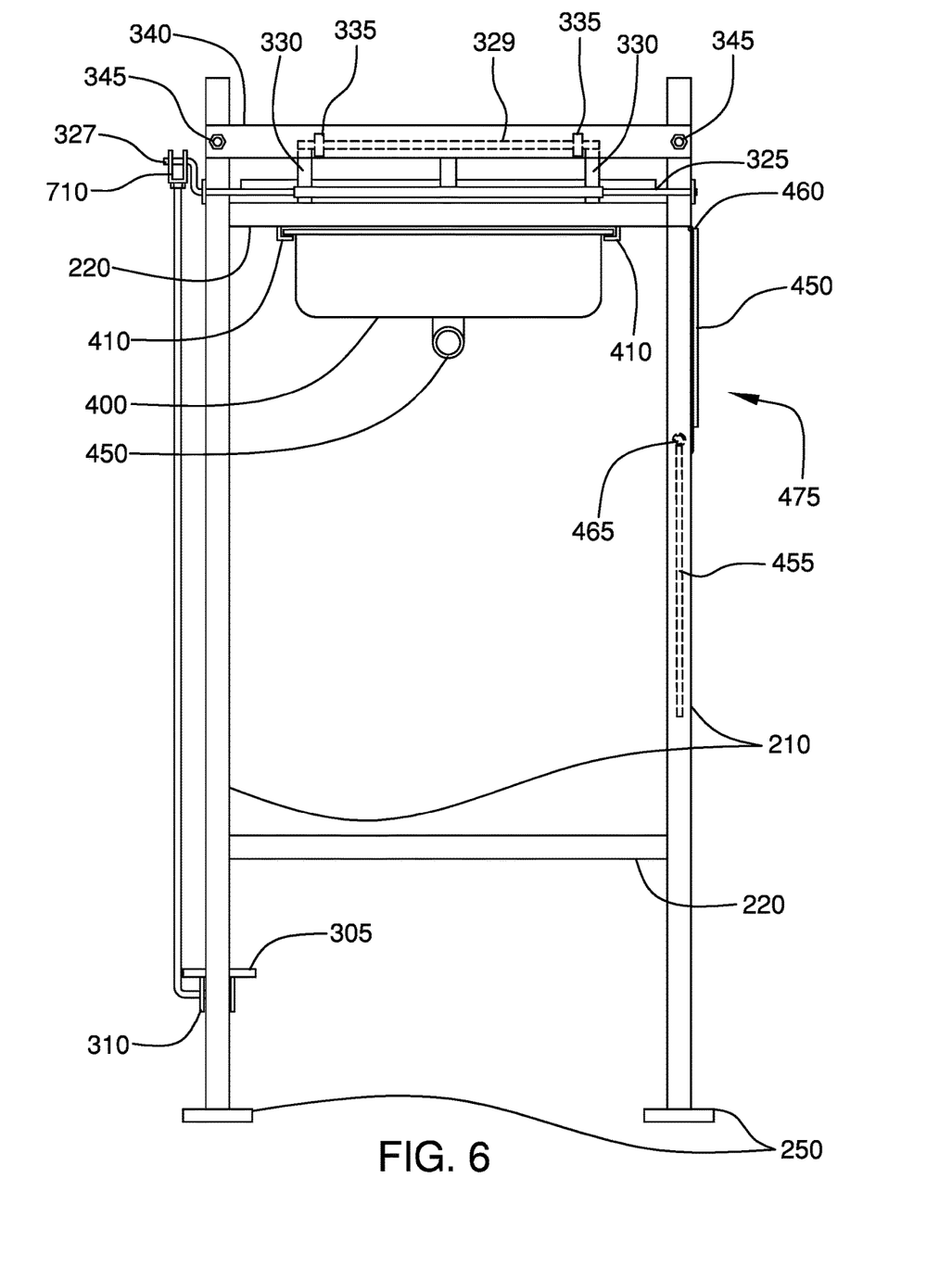
FIG. 6 is a rear view of an embodiment of the disclosure.
Figure 7:
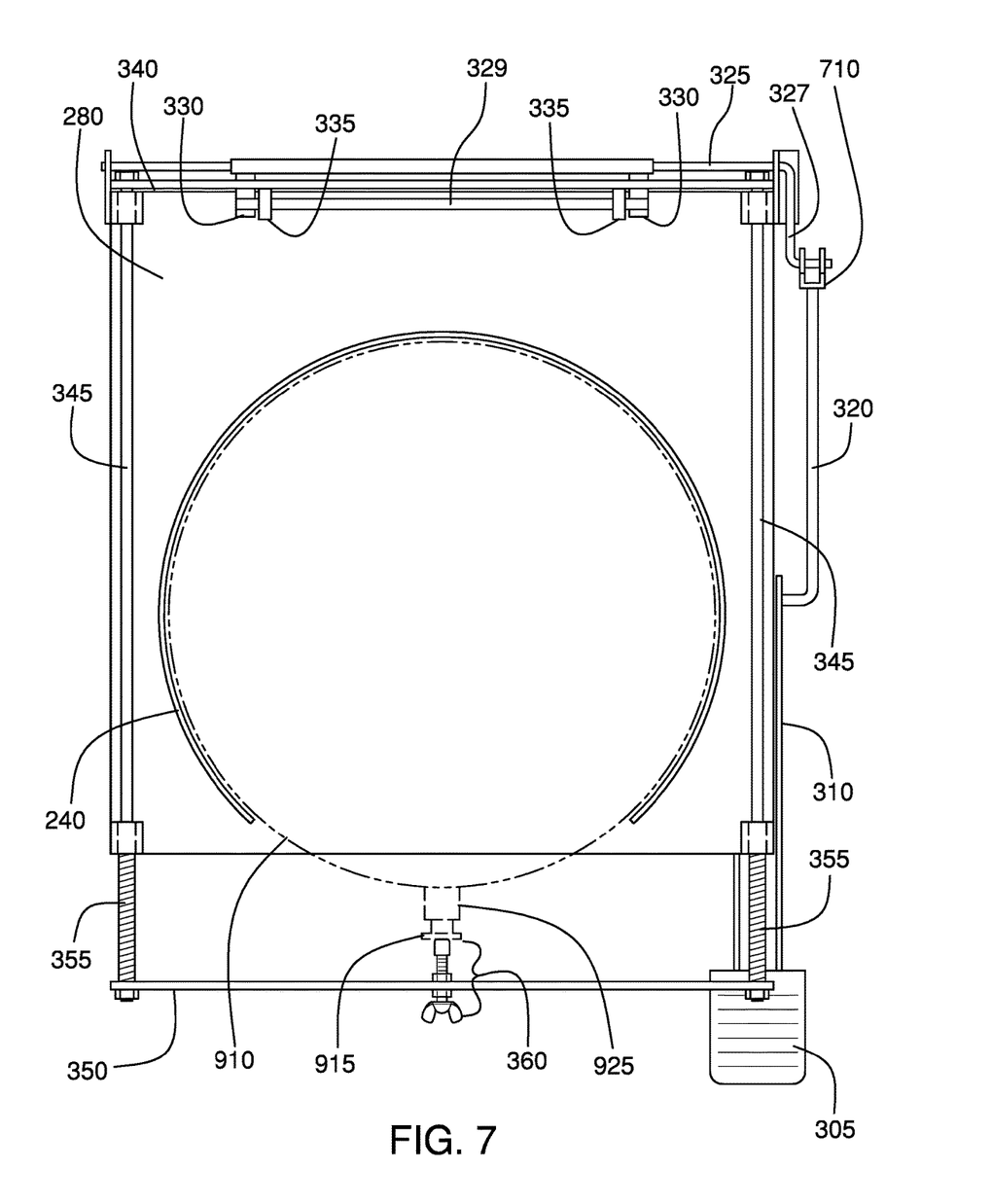
FIG. 7 is a top view of an embodiment of the disclosure.

Detailed reference will now be made to a first potential embodiment of the disclosure, which is illustrated in FIGS. 1 through 7.

The water cooler stand 100 (hereinafter invention) comprises a support stand 200 and a pivoting mechanism 300. The water cooler stand 100 holds a water cooler 910 at an elevated position and allows a user to dispense water without a user's hand touching the water cooler 910.

The support stand 200 comprises a plurality of legs 210, a plurality of cross braces 220, a top surface 230 and a cooler cradle 240. The support stand 200 elevates the water cooler 910 to an accessible height. Here, 'accessible height' is intended to mean that the bottom of the water cooler 910 is between 24 inches and 48 inches above the ground 900. The plurality of legs 210 are oriented vertically and may touch the ground 900 on a bottom side 815 of the support stand 200. The plurality of cross braces 220 may be oriented horizontally and may run both side-to-side and front-to-back. The plurality of cross braces 220 may couple to the plurality of legs 210 at each end of each of the plurality of cross braces 220. In some embodiments, the plurality of cross braces 220 that run from side-to-side may be at different heights than the plurality of cross braces 220 that run front-to-back. The plurality of legs 210 provide the required height for the support stand 200 and the plurality of cross braces 220 provide mechanical stability.

The top surface 230 may couple to the plurality of cross braces 220 and/or to the plurality of legs 210 near a top side 810 of the support stand 200. The plurality of legs 210 may extend higher than the top surface 230 to provide support for two pushrods 345. The top surface 230 provide a horizontal plane upon which the water cooler 910 may rest. The cooler cradle 240 is a C-shaped stop that couples to the top surface 230 and prevents the water cooler 910 from sliding backwards on the top surface 230. The cooler cradle 240 is oriented such that the C-shape is apparent when viewed from above the support stand 200 and the open side of the C-shape is facing a front side 800 of the support stand 200.

The support stand 200 may be fabricated from metal, plastic or other rigid, durable materials. As a non-limiting example, the support stand 200 may be fabricated from stainless steel with welded joints.

In some embodiments, each of the plurality of legs 210 may couple to a foot 250 at the bottom side 815 of each of the plurality of legs 210. The foot 250 may be the portion of the water cooler stand 100 that touches the ground 900. In some embodiments, the support stand 200 may comprise handle retention springs 235. Each of the handle retention springs 235 may couple at one end to the support stand 200 and at the other end to a handle retention hook 237. The handle retention hooks 237 may removably couple to a cooler handles 940 to secure the water cooler 910 to the support stand 200. The length of each of the handle retention springs 235 is shorter than the distance from the bottom of the water cooler 910 to the bottom of the cooler handles 940 so that the handle retention springs 235 must be stretched in order to couple the handle retention hooks 237 to the cooler handles 940. This causes the handle retention springs 235 to pull the cooler handles 940 down for increased stability.

The pivoting mechanism 300 comprises a foot pedal 305, a foot bar 310, a foot bar pivot point 315, a lift rod 320, a pivot rod 325, pivot rod rotation points 322, one or more cam arms 330, one or more cam bearings 335, a rear pressure plate 340, the two pushrods 345, a front pressure plate 350, two springs 355 and an adjustable push button 360. The pivoting mechanism 300 allows the user to press down on the foot pedal 305 to dispense the water from the water cooler 910 without touch the water cooler 910 with the user's hand.

The foot bar 310 pivotally couples to one of the front legs of the plurality of legs 210 such that one end of the foot bar 310 extends towards the front side 800 of the support stand 200 where the user is located and the other end of the foot bar 310 extends towards a rear side 805 of the support stand 200. The foot bar 310 pivots around the foot bar pivot point 315 located on one of the front legs of the plurality of legs 210. The front of the foot bar 310 is coupled to the foot pedal 305, which is what a user's foot presses down. The rear of the foot bar 310 is pivotally coupled to the lift rod 320.

The lift rod 320 runs from the rear end of the foot bar 310 to the pivot rod 325. Specifically, the top end of the lift rod 320 pivotally couples to a crank handle 327 on the pivot rod 325. The lift rod 320 may be a flat bar or a round rod. In some embodiments, the lift rod 320 may couple to the pivot rod 325 via a lift rod linkage 710.

The pivot rod 325 is a straight rod that is longer than the width of the support stand 200. One end of the pivot rod 325 terminates with two right-angle bends to form the crank handle 327. The two right-angle bends lie in the same plane. The crank handle 327 formed by the bends is oriented towards the front side 800 of the support stand 200. The pivot rod 325 is pivotally supported by two of the plurality of legs 210 that are located at the rear side 805 of the support stand 200 via the pivot rod rotation points 322. The one or more cam arms 330 are permanently coupled to the pivot rod 325 in a position where the one or more cam arms 330 extend towards the front side 800 of the support stand 200 and towards the top side 810 of the support stand 200. The one or more cam bearings 335 may be rotationally coupled to the one or more cam arms 330 and may press against the rear pressure plate 340. The one or more cam bearings 335 reduce friction between the one or more cam arms 330 and the rear pressure plate 340. In some embodiments, the one or more cam arms 330 may be independent of others of the one or more cam arms 330 and each of the one or more cam arms 330 may couple to the pivot rod 325 independently with each of the one or more cam bearings 335 coupled to the one or more cam arms 330.

In some embodiments, two or more of the one or more cam arms 330 may coupled to each other via a cam connecting rod 329. As a non-limiting example, the cam connecting rod 329 may interconnect the top, front ends of two or more of the one or more cam arms 330. In these embodiments, the one or more cam bearings 335 may ride on the cam connecting rod 329.

The rear pressure plate 340, the front pressure plate 350 and the two pushrods 345 may form a rectangular frame which surrounds the water cooler 910 and which moves as a single unit. Specifically, the rear end of each of the two pushrods 345 may couple to an end of the rear pressure plate 340 and the front end of each of the two pushrods 345 may couple to an end of the front pressure plate 350. The two pushrods 345 may be slidably coupled to the plurality of legs 210 near the top end of the plurality of legs 210. The rear pressure plate 340 may be a substantially straight armature that is positioned on the rear side 805 of the support stand 200 near the top side 810 of the support stand 200. The front pressure plate 350 may be a substantially straight armature that is positioned on the front side 800 of the support stand 200 near the top side 810 of the support stand 200. The rear pressure plate 340 and the front pressure plate 350 may be held in their respective positions by the two pushrods 345. In some embodiments, the support stand 200 comprises two pushrod tubes (not illustrated in the figures) which are located one on a right side 825 of the support stand 200 and one on a left side 820 of the support stand 200. Each of the two pushrod tubes are coupled on one end to a front leg of the plurality of legs 210 and on the other end to a rear leg of the plurality of legs 210. In embodiments that comprise the two pushrod tubes, the two pushrods 345 may each pass through one of the two pushrod tubes allowing the two pushrods 345 to move easier.

The two springs 355 may surround the two pushrods 345 at the front of the two pushrods 345, occupying a position between the front legs of the plurality of legs 210 and the front pressure plate 350. One of the two springs 355 may be located on each one of the two pushrods 345. In this position, the two springs 355 may push the front pressure plate 350 towards the front side 800 of the support stand 200.

The adjustable push button 360 may be coupled to the center of the front pressure plate 350. The adjustable push button 360 may present a finger-like protrusion pointing towards the rear side 805 of the support stand 200 and the specific extent of the protrusion may be adjustable. As a non-limiting example, the adjustable push button 360 may be threadably coupled to the front pressure plate 350 with a regular nut on the rear side of the front pressure plate 350 and a wing nut on the front side of the front pressure plate 350 such that the user may loosen the wing nut and the regular nut, screw the adjustable push button 360 into or out of the front pressure plate 350, and then tighten both the regular nut and the wing nut. The purpose of the adjustable push button 360 is to press a water-dispensing button 915 on the water cooler 910 whenever the adjustable push button 360 is pulled towards the rear side 805 of the support stand 200.

The pivoting mechanism 300 works as follows: When the user's foot presses down on the foot pedal 305, the front of the foot bar 310 pivots down and the rear of the foot bar 310 pivots up. When the rear of the foot bar 310 pivots up, it pushes the lift rod 320 up. When the lift rod 320 is pushed up, it pushes against the crank handle 327 causing the pivot rod 325 to rotate clockwise as seen from the right side 825 of the support stand 200. As the pivot rod 325 rotates clockwise, the one or more cam arms 330 also rotate clockwise, pushing the one or more cam bearings 335 against the rear pressure plate 340 and forcing the rear pressure plate 340 to move towards the rear side 805 of the support stand 200. As the rear pressure plate 340 moves rearward, the rear pressure plate 340 pulls the two pushrods 345 rearward and they in turn pull the front pressure plate 350 rearward against the pressure applied by the two springs 355. Rearward motion of the front pressure plate 350 cause the adjustable push button 360 to press the water dispensing button 915 and the water cooler 910 dispenses the water.

When the user's foot is removed from the foot pedal 305, the two springs 355 push the front pressure plate 350 towards the front side 800 of the support stand 200 and the rear pressure plate 340 is also pulled towards the front side 800 of the support stand 200 by the two pushrods 345. As the rear pressure plate 340 moves forward, the one or more cam bearings 335 are pushed forward against the one or more cam arms 330 causing the pivot rod 325 to rotate counter-clockwise as seen from the right side 825 of the support stand 200. Counter-clockwise rotation of the pivot rod 325 allows the end of the crank handle 327 to drop and this lowers the lift rod 320. As the lift rod 320 is lowered, the foot bar 310 pivots back to its original position.

The water cooler stand 100 may comprise a sink basin 400 which stores underneath the top surface 230 when not in use and which slides forward to an accessible position for use. Two sink rails 410 may be coupled to the plurality of cross braces 220, with the two sink rails 410 running from the front side 800 of the support stand 200 to the rear side 805 of the support stand 200 and separated by a distance that is at least the width of the sink basin 400 to allow the sink basin 400 to slide within the two sink rails 410. In some embodiments, one or more slide stops (not illustrated in the figures) may limited the forward and/or rearward sliding motion of the sink basin 400 so that the sink basin 400 is not unintentionally removed from the two sink rails 410.

The sink basin 400 is positioned such that when the sink basin 400 is pulled out for use, the sink basin 400 lies under a spigot 925 of the water cooler 910. In this position, the user may depress the foot pedal 305 and if a drain plug (not illustrated in the figures) is in place at a sink drain 405, the sink basin 400 will hold the water. When the water is no longer needed, the drain plug may be removed and the water will flow out of the sink basin 400 via the sink drain 405.

In some embodiments the water cooler stand 100 may comprise a side tray 450. The side tray 450 may provide workspace near the water cooler 910. As a non-limiting example, the side tray 450 may provide a place to stack drinking cups, dishes waiting to be washed, hand soap, or other items routinely used near the water cooler 910. The side tray 450 may be moved between a vertical position 470 for storage and a horizontal position 475 for use. The side tray 450 may be hingedly coupled to the plurality of legs 210 via tray hinges 460. The side tray 450 may comprise one or more tray support arms 455 which hold the side tray 450 in the horizontal position 475. The one or more tray support arms 455 may pivotally couple to the plurality of legs 210 via a tray support arm pivot points 465 and may rotate into a position where the one or more tray support arms 455 serve as a brace against downward rotation of the side tray 450.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A water cooler stand comprising:
a support stand and a pivoting mechanism;
wherein the water cooler stand holds a water cooler at an elevated position;
wherein the water cooler stand is adapted to allow a user to dispense water without a user's hand touching the water cooler;

wherein the support stand comprises a plurality of legs, a plurality of cross braces, a top surface and a cooler cradle;
wherein the support stand elevates the water cooler to an accessible height;
wherein the plurality of legs are oriented vertically and touch the ground on a bottom side of the support stand;
wherein the plurality of cross braces are oriented horizontally and run both side-to-side and front-to-back;
wherein the plurality of cross braces couple to the plurality of legs at each end of each of the plurality of cross braces;
wherein the top surface couples to the plurality of cross braces and/or to the plurality of legs near a top side of the support stand;
wherein the plurality of legs extends higher than the top surface to provide support for two pushrods;
wherein the top surface provides a horizontal plane upon which the water cooler rests.

2. The water cooler stand according to claim 1
wherein the cooler cradle is a C-shaped stop that couples to the top surface and prevents the water cooler from sliding backwards on the top surface;
wherein the open side of the C-shape is facing a front side of the support stand.

3. The water cooler stand according to claim 2
wherein each of the plurality of legs couple to a foot at the bottom side of each of the plurality of legs.

4. The water cooler stand according to claim 2
wherein the support stand comprises handle retention springs;
wherein each of the handle retention springs couple at one end to the support stand and at the other end to a handle retention hook;
wherein the handle retention hooks removably couple to a cooler handles to secure the water cooler to the support stand;
wherein the length of each of the handle retention springs is shorter than the distance from the bottom of the water cooler to the bottom of the cooler handles.

5. The water cooler stand according to claim 4
wherein the pivoting mechanism comprises a foot pedal, a foot bar, a foot bar pivot point, a lift rod, a pivot rod, pivot rod rotation points, one or more cam arms, one or more cam bearings, a rear pressure plate, the two pushrods, a front pressure plate, two springs and an adjustable push button;
wherein the pivoting mechanism is adapted to allow the user to press down on the foot pedal to dispense the water from the water cooler without touch the water cooler with the user's hand.

6. The water cooler stand according to claim 5
wherein the foot bar pivotally couples to one of the front legs of the plurality of legs such that one end of the foot bar extends towards the front side of the support stand and the other end of the foot bar extends towards a rear side of the support stand;
wherein the foot bar pivots around the foot bar pivot point located on one of the front legs of the plurality of legs;
wherein the front of the foot bar is coupled to the foot pedal;
wherein the rear of the foot bar is pivotally coupled to the lift rod.

7. The water cooler stand according to claim 6
wherein the lift rod runs from the rear end of the foot bar to the pivot rod;
wherein the top end of the lift rod pivotally couples to a crank handle on the pivot rod.

8. The water cooler stand according to claim 7
wherein the pivot rod is a straight rod that is longer than the width of the support stand;
wherein one end of the pivot rod terminates with two right-angle bends to form the crank handle;
wherein the two right-angle bends lie in the same plane;
wherein the crank handle formed by the bends is oriented towards the front side of the support stand.

9. The water cooler stand according to claim 8
wherein the pivot rod is pivotally supported by two of the plurality of legs that are located at the rear side of the support stand via the pivot rod rotation points;
wherein the one or more cam arms are permanently coupled to the pivot rod in a position where the one or more cam arms extend towards the front side of the support stand and towards the top side of the support stand;
wherein the one or more cam bearings are rotationally coupled to the one or more cam arms and press against the rear pressure plate;
wherein the one or more cam bearings reduce friction between the one or more cam arms and the rear pressure plate.

10. The water cooler stand according to claim 9
wherein the rear pressure plate, the front pressure plate and the two pushrods form a rectangular frame which surrounds the water cooler and which moves as a single unit;
wherein the rear end of each of the two pushrods couples to an end of the rear pressure plate and the front end of each of the two pushrods couples to an end of the front pressure plate;
wherein the two pushrods are slidably coupled to the plurality of legs near the top end of the plurality of legs.

11. The water cooler stand according to claim 10
wherein the rear pressure plate is a substantially straight armature that is positioned on the rear side of the support stand near the top side of the support stand;
wherein the front pressure plate is a substantially straight armature that is positioned on the front side of the support stand near the top side of the support stand;
wherein the rear pressure plate and the front pressure plate are held in their respective positions by the two pushrods.

12. The water cooler stand according to claim 11
wherein the support stand comprises two pushrod tubes which are located one on a right side of the support stand and one on a left side of the support stand;
wherein each of the two pushrod tubes are coupled on one end to a front leg of the plurality of legs and on the other end to a rear leg of the plurality of legs;
wherein the two pushrods each pass through one of the two pushrod tubes.

13. The water cooler stand according to claim 11
wherein the two springs surround the two pushrods at the front of the two pushrods;
wherein the two springs occupy a position between the front legs of the plurality of legs and the front pressure plate;
wherein one of the two springs is located on each one of the two pushrods;
wherein the two springs push the front pressure plate towards the front side of the support stand.

14. The water cooler stand according to claim 13
wherein the adjustable push button is coupled to the center of the front pressure plate;
wherein the adjustable push button presents a finger-like protrusion pointing towards the rear side of the support stand;
wherein the extent of the protrusion is adjustable;
wherein the adjustable push button presses a water dispensing button on the water cooler whenever the adjustable push button is pulled towards the rear side of the support stand.

15. The water cooler stand according to claim 14
further comprising a sink basin;
wherein the sink basin stores underneath the top surface when not in use;
wherein the sink basin slides forward to an accessible position for use;
wherein two sink rails are coupled to the plurality of cross braces;
wherein the two sink rails run from the front side of the support stand to the rear side of the support stand;
wherein the two sink rails are separated by a distance that is at least the width of the sink basin.

16. The water cooler stand according to claim 15
wherein one or more slide stops limit the forward and/or rearward sliding motion of the sink basin.

17. The water cooler stand according to claim 15
wherein the sink basin is positioned such that when the sink basin is pulled out for use, the sink basin lies under a spigot of the water cooler.

18. The water cooler stand according to claim 14
further comprising a side tray;
wherein the side tray provides workspace near the water cooler;
wherein the side tray moves between a vertical position for storage and a horizontal position for use wherein the side tray is hingedly coupled to the plurality of legs via tray hinges;
wherein the side tray comprises one or more tray support arms which hold the side tray in the horizontal position;
wherein the one or more tray support arms pivotally couple to the plurality of legs via a tray support arm pivot points;
wherein the one or more tray support arms rotate into a position where they brace against downward rotation of the side tray.

* * * * *